United States Patent
Bacha et al.

(10) Patent No.: US 10,552,729 B2
(45) Date of Patent: Feb. 4, 2020

(54) BASEBOARD MANAGEMENT CONTROLLER TO DECONFIGURE FIELD REPLACEABLE UNITS ACCORDING TO DEEP LEARNING MODEL

(71) Applicant: Hewlett Packard Enterprise Development LP, Houston, TX (US)

(72) Inventors: Anys Bacha, Dublin, OH (US); Doddyanto Hamid Umar, Singapore (SG)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 114 days.

(21) Appl. No.: 15/463,713

(22) Filed: Mar. 20, 2017

(65) Prior Publication Data
US 2018/0267858 A1 Sep. 20, 2018

(51) Int. Cl.
*G06N 3/04* (2006.01)

(52) U.S. Cl.
CPC .................... *G06N 3/0445* (2013.01)

(58) Field of Classification Search
CPC .. G06F 11/1476; G06F 11/1417; G06F 11/20; G06N 3/0445
USPC ..................................... 714/26, 37
See application file for complete search history.

(56) References Cited

U.S. PATENT DOCUMENTS

| | | | | |
|---|---|---|---|---|
| 5,253,184 A * | 10/1993 | Kleinschnitz | ............ | G07C 3/00 702/184 |
| 6,970,804 B2 | 11/2005 | Siegel et al. | | |
| 8,001,423 B2 * | 8/2011 | Spier | .................. | G05B 23/0275 714/26 |
| 8,504,875 B2 * | 8/2013 | Orita | .................. | G06F 11/0793 714/26 |
| 2004/0153819 A1 * | 8/2004 | Bjorsne | .............. | G01R 31/2837 714/37 |
| 2004/0221198 A1 * | 11/2004 | Vecoven | ............. | G06F 11/0727 714/25 |
| 2012/0110378 A1 * | 5/2012 | Fan | ..................... | G06F 11/1658 714/15 |
| 2017/0116103 A1 * | 4/2017 | Cencini | .............. | G06F 11/3055 |

(Continued)

FOREIGN PATENT DOCUMENTS

WO    WO-2015158198    10/2015

OTHER PUBLICATIONS

Intelligent Platform Management Interface, Mar. 4, 2016, Wikipedia, pp. 1-7.*

(Continued)

*Primary Examiner* — Jason B Bryan
*Assistant Examiner* — Indranil Chowdhury
(74) *Attorney, Agent, or Firm* — Hewlett Packard Enterprise Patent Department (57) ABSTRACT

Examples disclosed herein relate to a baseboard management controller (BMC) capable of execution while a computing device is powered to an auxiliary state. The BMC is to process an error log according to a deep learning model to determine one of multiple field replaceable units to deconfigure in response to the error condition. The BMC is to deconfigure the field replaceable unit. The computing device is rebooted. In response to the reboot of the computing device the BMC is to determine whether the error condition persists.

19 Claims, 3 Drawing Sheets

(56) References Cited

U.S. PATENT DOCUMENTS

2018/0197574 A1* 7/2018 Guo .................... G06N 3/08

OTHER PUBLICATIONS

Hsu, Y.Y. et al., "A Self-Learning Fault Diagnosis System Based on Reinforcement Learning", (Research Paper), Industrial & Engineering Chemistry Research, Aug. 1992, pp. 1937-1946. vol. 31. No. 8.
Jia, F. et al., "Deep Neural Networks: A Promising Tool for Fault Characteristic Mining and Intelligent Diagnosis of Rotating Machinery With Massive Data", (Research Paper), Mechanical Systems and Signal Processing May 2016 pp. 303 315 vol. 72 73.
Jiang, P. et al., "Fault Diagnosis Based on Chemical Sensor Data With an Active Deep Neural Network", (Research Paper), Sensors Basel Sensors, Oct. 13, 2016, vol. 16, No. 10 22 Pgs.
Zhao, T. et al., "Towards End-To-End Learning for Dialog State Tracking and Management Using Deep Reinforcement Learning", (Research Paper), Proceedings of the SIGDIAL 2016 Conference Sep. 15, 2016 pp. 1-10.

* cited by examiner

BASEBOARD MANAGEMENT CONTROLLER TO DECONFIGURE FIELD REPLACEABLE UNITS ACCORDING TO DEEP LEARNING MODEL

BACKGROUND

Information Technology companies and manufacturers are challenged to deliver quality and value to consumers, for example by providing computing devices with high availability. High availability is a characteristic that aims to ensure a level of operational performance, such as uptime for a period higher than a system that does not have the high availability characteristic. However, some computing devices with the high availability characteristic do become unavailable.

BRIEF DESCRIPTION OF THE DRAWINGS

The following detailed description references the drawings, wherein.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Information Technology (IT) companies and computer manufacturers are challenged to deliver quality and value to consumers, for example by providing computing devices with high availability. High availability is a characteristic that aims to ensure a level of operational performance, such as uptime for a period higher than a system that does not have the high availability characteristic. However, some computing devices with the high availability characteristic do become unavailable.

With today's businesses demanding near real-time analytics on big data in order to conduct their daily transactions, IT companies are constantly being challenged to produce highly complex, yet fault tolerant systems to empower datacenters. As such, having the ability to efficiently diagnose and repair failures of increasingly complex systems can be advantageous. Error analysis tools may be static and could require a user to help determine a root cause of an error. With complex failures, the computing system may need to be shipped back to a lab to determine the cause of the error. There is a time and shipping cost for this type of analysis.

Accordingly, various examples provided herein use a deep learning architecture that can autonomously assist IT personnel and field engineers in determining faulty components that may need to be replaced. The examples include usage of Recurrent Neural Networks (RNN) for processing system events to distinguish between the different causes and effects of a given failure, and make the appropriate predictions on which components to replace. A baseboard management controller (BMC) can be used to perform the analysis at the computing device with an error.

BMCs provide so-called "lights-out" functionality for computing devices. The lights out functionality may allow a user, such as a systems administrator to perform management operations on the computing device even if an operating system is not installed or not functional on the computing device. Moreover, in one example, the BMC can run on auxiliary power, thus the computing device need not be powered on to an on state where control of the computing device is handed over to an operating system after boot. As examples, the BMC may so-called provide management and so-called "out-of-band" services, such as remote console access, remote reboot and power management functionality, access to system logs, and the like. As used herein, a BMC has management capabilities for sub-systems of a computing device, and is separate from a processor that executes a main operating system of a computing device. The BMC may comprise an interface, such as a network interface, and/or serial interface that an administrator can use to remotely communicate with the BMC.

As noted, the BMC can have access to system logs. In one example, when an error condition occurs on the computing device, the BMC can process system logs to determine a root cause for the error condition based on the deep learning approach. In some examples, the system logs can come from Field Replaceable Units (FRUs) or be related to the FRUs. As used herein, a field replaceable unit is a circuit board, part, or assembly that can be easily removed from a computing device and replaced by a user or technician without having to send the whole computing device to a repair facility. Examples of FRUs include parts that can attach to other parts of the computing device using a socket, a card, a module, etc. Further, examples of FRUs can include computing modules, memory modules, peripheral cards and devices, etc. In some examples, the system logs can include registers that provide particular information (e.g., an error flag for a particular component, a type of error, a current configuration, a location associated with an error, etc.).

The BMC can process the information from the logs according to the deep learning model to determine scores associated with each of a number of the FRUs. The scores can relate to the likelihood that the FRU has responsibility for the error condition. In other examples, the scores can be associated with sets of FRUs. Once each of the logs are processed, the FRU (or set of FRUs) with a highest likelihood of being responsible for the error condition can be deconfigured by the BMC. Once deconfigured, the computing device can be rebooted to determine if the error persists.

In some examples, determining whether the error persists can include testing (e.g., initializing memory, writing to and reading back from various locations, etc.). In one example, if the error condition is not removed, the next FRU or set of FRUs likely to be responsible can be deconfigured. This can repeat. Moreover, in some examples, the failure to remove the error condition can be taken into account for re-scoring the FRUs.

In one example, if the error condition is removed, the BMC can send information about the logs (e.g., the logs themselves, a condensed version of the logs, etc.) as well as information about the FRU or set of FRUs deconfigured to an error analysis platform. In some examples, the information sent can also include information about deconfigured FRUs that did not cause the error condition. The error analysis platform can take the feedback, along with parameters of a current deep learning model and feedback from other computing devices to update parameters for the deep learning model. The updated parameters can be provided to the BMC and other computing devices.

Unlike a static error analysis engine, the approaches described herein are autonomous and can self-learn. In one example, the approach can learn from multiple different computing devices providing feedback. In this example, a set of updated deep learning parameters can be determined and sent back to the computing devices. In another example, the deep learning model can be implemented while processing an error log in a computing device with an error condition. The implementation can also learn from mispredictions of a faulty component or field replaceable unit.

Further, the use of a deep neural network can reduce the costs associated with handcrafting complex rules for analyzing and recovering from errors in computing devices that are used in statically defined analyzers. Moreover, static analyzers may suffer from a lack of portability across different platform types and architectures. The approaches described herein offer a simpler approach where deep learning is used to capture mathematical functions for performing error analysis and recovery. A mathematical approach is advantageous because it can be generalized for other platforms and architectures. As noted, parameters from the deep learning model can be updated and provided back to BMCs within computing devices.

Figure 1:
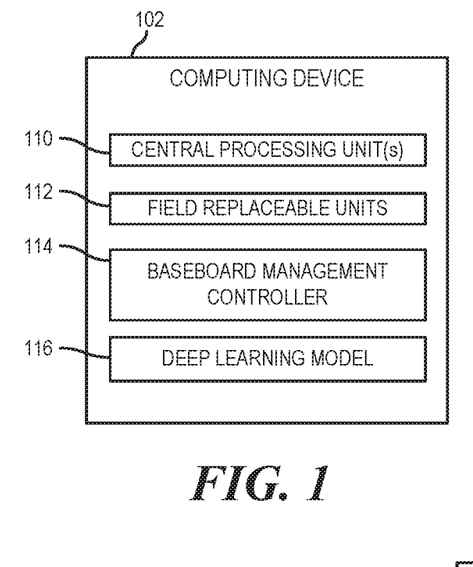
FIG. 1 is a block diagram of a computing device including a baseboard management controller capable to process an error log according to a deep learning model to determine field replaceable units to deconfigure, according to one example.
Figure 2:
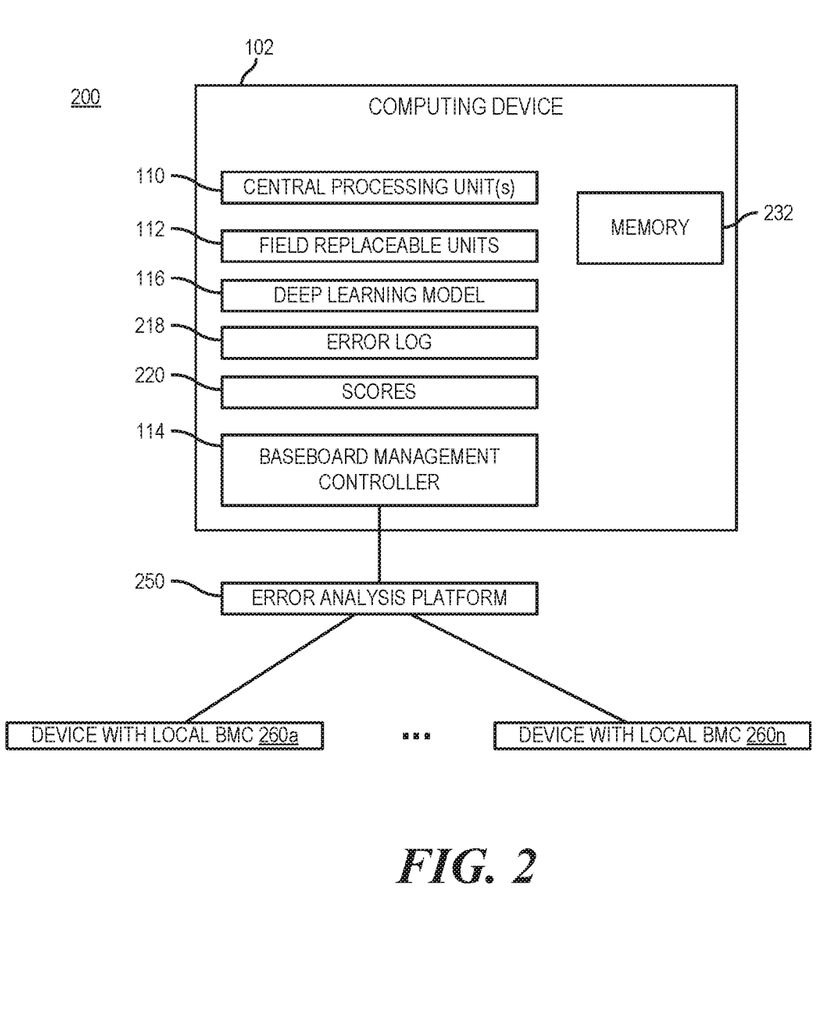
FIG. 2 is a block diagram of a system including devices each with a baseboard management controller capable to process respective error logs according to a deep learning model to determine field replaceable units to deconfigure, according to one example.

FIG. 1 is a block diagram of a computing device including a baseboard management controller capable to process an error log according to a deep learning model to determine field replaceable units to deconfigure, according to one example. FIG. 2 is a block diagram of a system including devices each with a baseboard management controller capable to process respective error logs according to a deep learning model to determine field replaceable units to deconfigure, according to one example.

In the example of FIG. 1, the computing device 102 includes a central processing unit 110, a number of field replaceable units 112, and baseboard management controller 114. In some examples, an FRU 112 can include the central processing unit 110. In the example of FIG. 2, the computing device 102 can be included in a system 200 that can also include an error analysis platform 250 that can receive feedback from multiple devices with a local BMC 260a-260n. The error analysis platform 250 can take the feedback information to determine updates to parameters for a deep learning model 116 that is used to autonomously diagnose a cause for an error condition of the computing device 102.

When an error condition affects the computing device 102, the BMC 114 can be notified (e.g., via an interrupt, a change in status of memory polled by the BMC 114, etc.).

The BMC 114 can determine that an error condition is present. Further, the BMC 114 can use an error log 218 to analyze the error condition of the computing device 102. The error log 218 can be a single error log or can include multiple error logs, for example error logs retrieved from or read from various hardware devices (e.g., FRUs 112 or components of the FRUs 112), an operating system executing on the central processing unit 110, or the like. In one example, the error log may include registers. In the example, each of the registers or other error log information can relate to particular information, for example, relate to a particular FRU, relate to particular components of the FRU, relate to particular errors or conditions of the FRU, etc. The error log may identify the particular register or component as well. This can be used to map the information to the deep learning model. The functionality of the BMC 114 described herein can be implemented by executing instructions stored in memory 232.

As noted, in one example, the processing of the error log 218 can include processing using the deep learning model 116. Various deep learning models can be used. Examples of deep learning models include long short-term memory (LSTM), a convolution neural networks, recurrent neural networks, neural history compressor, recursive neural networks, gated recurrent unit (GRU), etc. An advantage to a recurrent neural network is the inclusion of feedback. An example of one implementation of using an LSTM approach as the deep learning model 116 is provided in the explanation corresponding to FIG. 5. The parameters used for the deep learning model 116 can be updated based on feedback from the computing device 102 or other devices with local BMCs 260 as discussed herein.

The deep learning model 116 can be applied to determine one of the FRUs 112 or a set of the FRUs 112 that can be deconfigured in response to the error condition. When the BMC 114 processes the error log 218 according to the deep learning model 116, a score can be assigned to each of the FRUs 112 and/or to sets of FRUs 112. The scores can relate to probability that the FRU or set of FRUs 112 is a root cause for the error condition.

In one example model, the error log can be processed as characters. In the example model, characters can represent registers associated with dumps from FRU components or systems logs. In one example, each character can be considered an input vector. When a character is processed, each of the scores for the FRUs can be updated. The updated scores can be included as an input vector along with the next character. The processing can continue until a character represents an end of the log. In an LSTM model, characters can be broken up by special characters and taken as a group. For example, a first character may identify an FRU's log, a second, third, and fourth character may include log register information, and a special character (fifth character) may indicate that the information about the FRU's log is over. In this example, the five characters are meant to be processed together.

Once the information is processed, the information may be forgotten (though the updated scores remain) and a next set of characters can be read to update the scores for the FRUs. In some examples, the scores can be used to rank the probability that each of the FRUs or sets of FRUs are a root cause of the error condition. For example, a softmax function may be used to organize the scores (e.g., the softmax function can be used normalize the vectors into real values in the range of [0, 1] that add up to 1).

One of the FRUs or sets of FRUs can be selected based on the analysis (e.g., the set of FRUs scored to have the highest probability to be the root cause of the error condition compared to the other FRUs). The BMC 114 can be caused to deconfigure the FRU. In some examples, the deconfiguration of the FRU can be implemented by disabling the FRU. In one example, the disabling of the FRU can include removing power to the FRU. In another example, disabling of the FRU can include removing communications capabilities from the FRU. In a further example, disabling of the FRU can include putting the FRU in a disconnected hot plug or hot swap state.

Once the FRU(s) selected is deconfigured, the computing device 102 can be rebooted. Once reboot has occurred, the BMC 114 can determine whether the error condition persists. In one example, a test can be performed to determine whether the error condition persists. The test can be directed to the FRU or the computing device in general. In one example, the BMC 114 performs the test. In another example, the BMC 114 is communicatively coupled to another processor (e.g., CPU 110), which is instructed to perform the test.

If the error condition persists, the next most probable FRU or set of FRUs can be selected to be deconfigured. In one example, the next most probable FRU is determined by determining a new score relating to the probability of failure for each of the FRUs/sets of FRUs as part of processing the error log again, but this time with the additional information that the previous attempt failed and the error condition persisted. The selected FRU or set of FRUs can include at least one FRU that was not in the original selection. The selected FRU or set of FRUs is deconfigured and the computing device can be rebooted and tested again. If the error condition continues to persist, the next set(s) of FRUs can be selected. Various approaches can be used to select the FRU or set of FRUs, for example, Qlearning, Markov Decision Process (MDP), etc.

If the error condition does not persist after a reboot, the error log and the information regarding the deconfiguration can be sent to the error analysis platform 250. This allows for the feedback to be provided to other devices with local BMCs 260 similar to the computing device. The error analysis platform 250 can use the information as part of a new sample set to provide to the deep learning model to update parameters based on the real world experience of the computing device 102.

The error analysis platform 250 can update the parameters for the deep learning model 116 for the computing device 102. The parameters can also be used in the other devices with local BMCs 260. The updated parameters can be sent by the error analysis platform 250 back to the devices that can use the updated parameters for future error log processing.

The deep learning model can be trained on the error analysis platform 250 or another platform. The training may include initial error log impressions from a technical expert making the training sets based on error log entries (e.g., an error log entry of a register indicating that a memory module has an unrecoverable hard error may be trained to indicate that the memory module is a root cause for that error). Similarly, full systems configurations can be added to the sample sets as well. For example, a configuration where a peripheral network card FRU has a hardware error, but two other FRUs (e.g., memory modules) have errors that were caused by the network card FRU, the root cause may be trained to be the network card (for that specific case). The training sets can be determined from observations. Feedback can come from computing devices put into implementation or from test units. As noted, the feedback can be used as training data to update the parameters for the deep learning model. Various approaches can be used to implement the deep learning approach to update parameters on the error analysis platform 250, for example, RMSprop, Adagrad, Adam, etc. In one example, gradient descent optimization algorithms can be used.

As such, the BMC 114 can receive the updated parameters for the deep learning model 116 from the error analysis platform 250 based on the error log and the information regarding the deconfigured FRU. Similarly, the updated parameters may include log and information regarding other deconfigured FRUs from other devices with local BMCs 260. When another error condition occurs on the computing device or one of the other devices with local BMCs 260 capable of implementing this approach, a new error log associated with that error condition can be processed as discussed above using the updated parameters.

In some examples, each of the computing device 102 and the devices with local BMCs 260 can have a common technology platform. For example, each of the devices may be part of a same series server line. Moreover, particular FRUs may be tested for use with that common technology platform to provide sample training formation. In some examples, newly seen FRUs may create new training information as part of feedback. In one example, the error analysis platform 250 may be communicatively coupled to the BMC 114. In another example, the error analysis platform 250 is on a separate network, but feedback can be provided via a message (e.g., email or via an API) and updated parameters may be provided in a similar way (e.g., an update file provided via an administrator device). Because access to BMCs 114 can be via a separate control network, the access between the error analysis platform 250 and the BMCs need not be constant.

The deep learning model 116 can be trained using training data. In one example, the training data may include an error log entry and an identification of the FRU(s) that were the root cause of an error associated with the error log entry. In other examples, the training data may include static data of error log information and root cause FRU identification.

The deep learning parameters can be trained using a deep learning approach. The training can involve determination of a change to each parameter based on training information. Examples of such learning algorithms include gradient descent, various approaches used by Distbelief, Project Adam, and Hama, and stochastic gradient descent by back-propogation, among others.

A commonly used technique in distributed deep learning for both convolution neural network and recurrent neural network models is data parallelism. In this example, each worker (e.g., a central processing unit (CPU) or graphical processing unit (GPU)) receives a subset of a batch of training data. Each worker iteratively processes new training data from its subset of batches of the training data. The workers communicate by exchanging gradient updates. A parameter server is used to provide each of the workers the same model parameters. As such, in some examples, the error analysis platform can be implemented over a number of computing devices.

The following is an example model of distributed deep learning. In this example of distributed deep learning, each worker receives a subset of training data and a full set of model parameters for each iteration of training. At the beginning of one iteration, every worker sends a pull request to the parameter server and gets a latest copy of the parameters W, which might contain a number of floating-point values for a deep learning model. Each copy of the parameters on each device is called a model replica. Each model replica works on a different input training data subset. For example, each subset can contain error log information including an identification of one or more FRUs associated with the information and status registers that provide additional information (e.g., state information, error conditions, etc.).

Each model replica calculates its data gradients (in an example with three workers $\Delta D1$, $\Delta D2$, $\Delta D3$) with its own mini-batch input and sends the gradients back (usually a push request) to the parameter server. The parameter server gathers the gradients from all the workers, calculates the average of the gradient, and updates the model accordingly. For example, a new W' can equal the previous W plus a learning rate times an average of the data gradients. Shown as an equation, the new W' can be expressed as W'=W+learning rate*average ($\Delta D1$, $\Delta D2$, $\Delta D3$). The deep learning model 116 can be initially trained using predefined training data and then updated based on real world feedback.

A communication network can be used to communicatively couple the computing device with other computing devices and/or the error analysis platform. The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s).

By way of example, devices communicate with each other and other components with access to communication networks via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

The BMC 114 can include hardware and/or combinations of hardware and programming to perform functions provided herein. As noted, the BMC 114 can provide so-called "lights-out" functionality for computing devices. The lights out functionality may allow a user, such as a systems administrator to perform management operations on the computing device even if an operating system is not installed or not functional on the computing device. Moreover, in one example, the BMC 114 can run on auxiliary power, thus the computing device need not be powered on to an on state where control of the computing device is handed over to an operating system after boot. As examples, the BMC 114 may so-called provide management and so-called "out-of-band" services, such as remote console access, remote reboot and power management functionality, access to system logs, and the like. As used herein, a BMC 114 has management capabilities for sub-systems of a computing device, and is separate from a processor that executes a main operating system of a computing device. The BMC 114 may comprise an interface, such as a network interface, and/or serial interface that an administrator can use to remotely communicate with the BMC 114. Moreover, as described herein, the BMC 114 may be capable to receive error log information and to deconfigure FRUs 112.

A processor, such as a central processing unit (CPU) 110 or a microprocessor suitable for retrieval and execution of instructions and/or electronic circuits can be configured to perform the functionality for the computing device 102 separately from the BMC 114.

Figure 3:
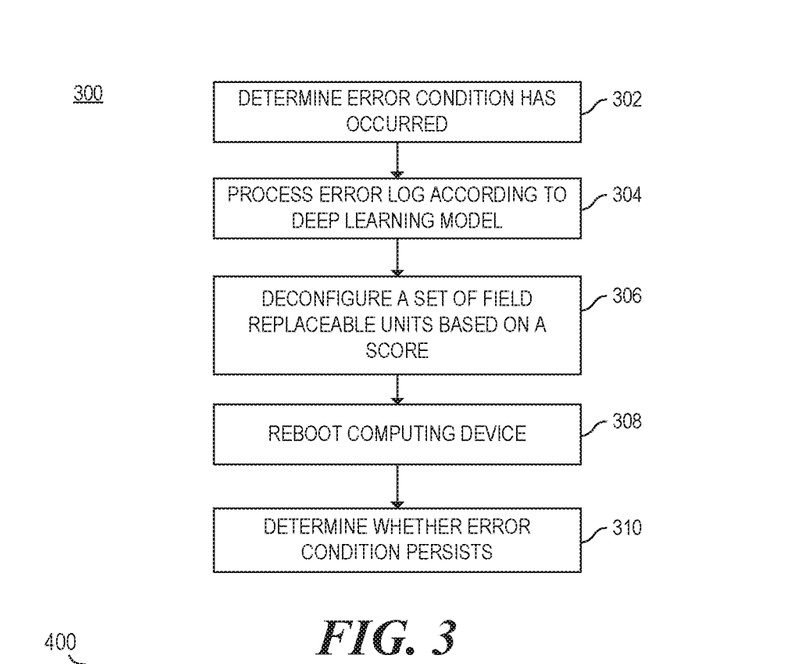
FIG. 3 is a flowchart of a method for deconfiguring field replaceable units by a baseboard management controller according to a deep learning model, according to an example.
Figure 4:
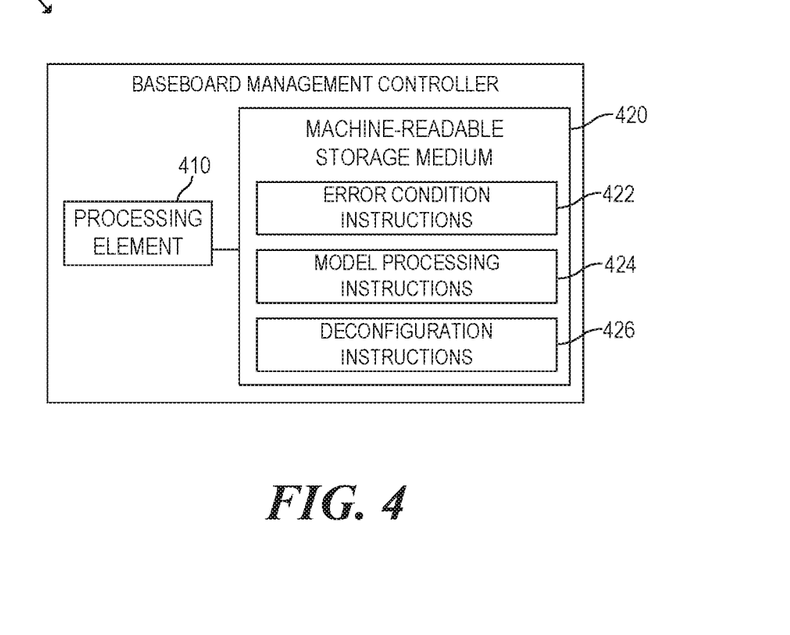
FIG. 4 is a block diagram of a baseboard management controller capable of deconfiguring field replaceable units according to a deep learning model in response to an error condition, according to an example.

FIG. 3 is a flowchart of a method for deconfiguring field replaceable units by a baseboard management controller according to a deep learning model, according to an example. FIG. 4 is a block diagram of a baseboard management controller capable of deconfiguring field replaceable units according to a deep learning model in response to an error condition, according to an example. Although execution of method 300 is described below with reference to BMC 400, other suitable components for execution of method 300 can be utilized (e.g., computing device 102). Method 300 may be implemented in the form of executable instructions stored on a machine-readable storage medium, such as storage medium 420, and/or in the form of electronic circuitry.

The BMC 400 may be part of a computing device with multiple FRUs. As noted above, BMC 400 can provide so-called "lights-out" functionality for computing devices. The lights out functionality may allow a user, such as a systems administrator to perform management operations on the computing device even if an operating system is not installed or not functional on the computing device. Moreover, in one example, the BMC 400 can run on auxiliary power, thus the computing device need not be powered on to an on state where control of the computing device is handed over to an operating system after boot. As examples, the BMC 400 may so-called provide management and so-called "out-of-band" services, such as remote console access, remote reboot and power management functionality, access to system logs, and the like. As used herein, a BMC 400 has management capabilities for sub-systems of a computing device, and is separate from a processor that executes a main operating system of a computing device. The BMC 400 may comprise an interface, such as a network interface, and/or serial interface that an administrator can use to remotely communicate with the BMC 400. As used herein, an auxiliary state is a state where the BMC 400 is capable of functionality while a main subsystem of the computing device is not capable of functionality (e.g., when the computing device is powered off, but plugged in, when the main subsystem is in an error condition state, etc.). In some examples, the BMC 400 may host a web server that allows for communications via the network interface.

As noted, the BMC 400 can have access to system logs. In one example, when an error condition occurs on the computing device, the BMC 400 can process system logs to determine a root cause for the error condition based on the deep learning approach. The processing element 410 can execute error condition instructions 422 to determine that an error condition has occurred in the computing device (302). When the error condition affects the computing device, the BMC 400 can be notified (e.g., via an interrupt, a change in status of memory polled by the BMC 400, etc.). The BMC 400 can determine that the error condition is present.

The BMC 400 can also receive an error log. At 304, the model processing instructions 424 can be executed by the processing element 410 to process the error log according to a deep learning model. The error log can be a single error log or can include multiple error logs, for example error logs retrieved from or read from various hardware devices (e.g., FRUs or components of the FRUs), an operating system executing on a central processing unit associated with a main subsystem of the computing device, or the like. In one example, the error log may include registers. In the example, each of the registers or other error log information can relate to particular information, for example, relate to a particular FRU, relate to particular components of the FRU, relate to particular errors or conditions of the FRU, etc. The error log may identify the particular register or component as well. This can be used to map the information to the deep learning model. As noted above, the processing can be used to determine a score for each of a number of sets of the FRUs of the computing device. As used herein, a set of FRUs includes one FRU or multiple FRUs. As described above, the scores can relate to a probability to remove the error condition by deconfiguration of the set of FRUs. In some examples, the deep learning model includes updated parameters based on error condition feedback from at least one other device.

At 306, the deconfiguration instructions 426 can be executed by processing element 410 to deconfigure a first one of the sets of FRUs based on the score associated with the set (e.g., the set of FRUs scored to have the highest probability to be the root cause of the error condition compared to the other FRUs). The processing element 410 can be caused to deconfigure the FRU. In some examples, the deconfiguration of the FRU can be implemented by disabling the FRU. In one example, the disabling of the FRU can include removing power to the FRU. In another example, disabling of the FRU can include removing communications capabilities from the FRU. In a further example, disabling of the FRU can include putting the FRU in a disconnected hot plug or hot swap state. For example, a configuration parameter associated with the FRU can be set to indicate to the computing device/FRU that the FRU is not to function.

Once the set of FRUs selected is deconfigured, the computing device can be rebooted (308). Once reboot has occurred, the BMC 400 can determine whether the error condition persists. In one example, a test can be performed to determine whether the error condition persists. The test can be directed to the FRU or the computing device in general. In one example, the BMC 400 performs the test. In another example, the BMC 400 is communicatively coupled to another processor in the main subsystem of the computing system (e.g., a CPU) that is not deconfigured, which is instructed to perform the test.

If the error condition persists, the next most probable set of FRUs can be selected to be deconfigured. In one example, the next most probable FRU is determined by determining a new score relating to the probability of failure for each of the sets of FRUs as part of processing the error log again, but this time with the additional information that the previous attempt failed and the error condition persisted. The selected set of FRUs can include at least one FRU that was not in the original selection. The selected set of FRUs is deconfigured and the computing device can be rebooted and tested again. If the error condition continues to persist, the next set(s) of FRUs can be selected. Various approaches can be used to select the FRU or set of FRUs, for example, Qlearning, Markov Decision Process (MDP), etc.

If the error condition does not persist after a reboot, the error log and the information regarding the deconfiguration configuration of FRUs can be sent to the error analysis platform. This allows for the feedback to be provided to other devices with local BMCs similar to the computing device. The error analysis platform can use the information as part of a new sample set to provide to the deep learning model to update parameters based on the real world experience of the computing device. The BMC 400 can receive updated parameters for the deep learning model from the error analysis platform that takes into consideration of the error log information and the information about the set of the FRUs that was deconfigured. The updated parameters may also take into consideration other sets of FRUs deconfigured in response to other error conditions associated with other similar computing devices. The FRUs deconfigured from the other similar computing devices may be considered additional training data from the other computing devices that represent real life experiences. As noted above, the error analysis platform can update parameters for the deep learning model from the information provided and other training data.

Processing element 410 may be, one or multiple processing unit, one or multiple semiconductor-based microprocessor, other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, or combinations thereof. Processing element 410 may fetch, decode, and execute instructions 422, 424, 426 to implement method 300. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for implementing method 300.

Figure 5:
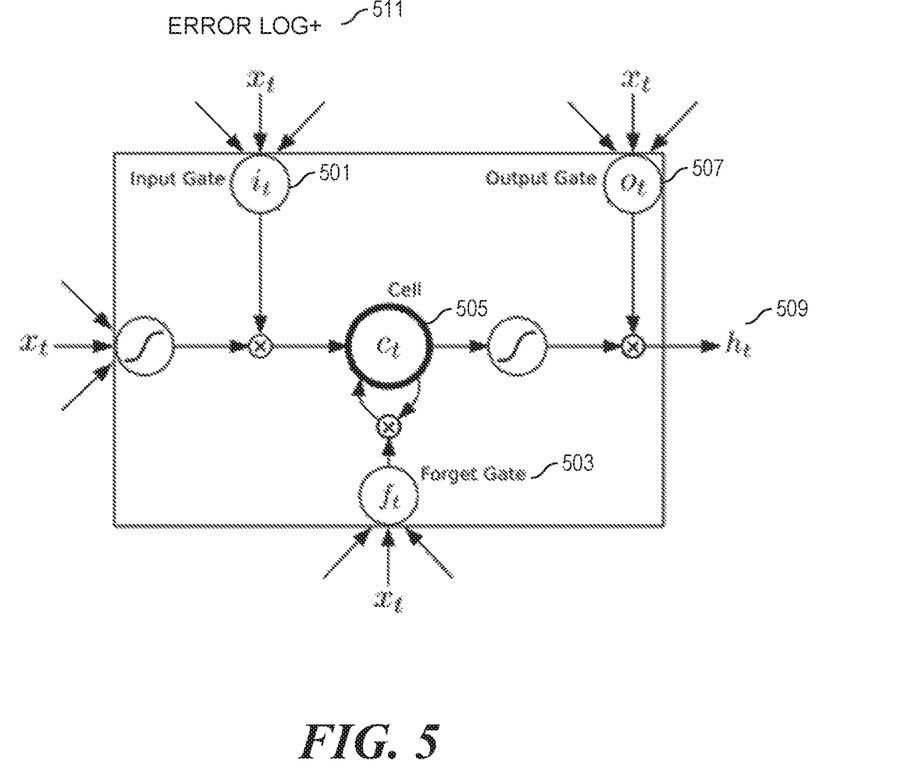
FIG. 5 is a diagram of a deep learning model, according to one example.

FIG. 5 is a diagram of a deep learning model, according to one example. The deep learning model example includes LSTM, LSTM can be beneficial for error analysis because of its ability to remember appropriate sequences via gates. An input gate $i_t$ 501 controls the amount of input written into a neuron's memory cell at time step t. In this scenario, the error log can provide input. A forget gate $f_t$ 503 controls the amount of information to be forgotten from a neuron's memory cell at time step t. With this approach, a set of characters can be grouped together to update an output and then cleared. The cell $c_t$ 505 represents the content of the neuron's memory cell at time step t. The output gate $o_t$ 507 controls the amount of information read from the neuron's cell and how much of it contributes to the output at time step L. The output $h_t$ 509 represents the output of the cell to the next layer at time step t. This output is also fed back into the same neuron and used in the following time step $t_{t+1}$. In the example of FIG. 5, $x_t$ can be represented by error log+ 511. Error log+ can be considered the input vector to the gates. The input vector can be the same for each gate as shown in FIG. 5. In some examples, this can include information from the error log plus hidden inputs (e.g., $h_t$ 509 before the end of the processing of the error log).

The following equations can be used to implement one example LSTM model: $i_t = \sigma(W_{xi} x_t + W_{hi} h_{t-1} + b_i)$ Eq. 1; $f_t = \sigma(W_{xf} x_t + W_{hf} h_{t-1} + b_f)$ Eq. 2; $o_t = \sigma(W_{xo} x_t + W_{ho} h_{t-1} + b_o)$ Eq. 3; $c_t = f_t \odot c_{t-1} + i_t \odot \tan h(W_{xc} x_t + W_{hc} h_{t-1} + b_c)$ Eq. 4; $h_t = o_t \odot \tan h(c_t)$ Eq. 5; $\sigma(z) = 1/(1+e^{-z})$ Eq. 6; $\tan h(z) = 2\sigma(2z) - 1$ Eq. 7. In the equation set, b represents a parameter vector from the deep learning model, the Ws represent parameter matrices for the deep learning model, x represents an input vector, h represents an output vector, c represents a cell state vector, and f, i, and o represent gate vectors.

Note that equations 1-5 are representative of neurons for an entire layer within FIG. 5. This implies that $i_t$, $f_t$, $o_t$, $c_t$, $h_t$, $h_{t-1}$, and $x_t$ are vectors. In the example, the W's are matrices. In other words, if a given matrix W is augmented to include the weights for both x and h such that its dimensions become n×m, then each row in $W^l$ for hidden layer l would be mapped to neuron j where $j \in [1, n]$. Moreover, the $\odot$ operator is a dot product operation.

The tan h and $\sigma$ (sigmoid) activation functions are also outlined in equations 6 and 7 for clarity. These functions are applied as element wise operations on the resulting vectors. Other example LSTM models can be implemented, such as a Gated Recurrent Unit. Further, as noted above, other deep learning models may be used.

The example operates through the consumption of characters as input vectors. For the purpose of this example, assume characters that are sourced from an MCE log as input. In the example, the BMC can focus on analysis where actions at the system level can be performed. However, approach can be capable to process other log types as long as the model it is trained with data in the desired format. The neural network can make delayed predictions as it consumes input vectors (consuming one character at a time) by generating <NOP> tags as output for each time step. As noted, the output, $h_t$ 509, can provide hidden output that can be used as feedback to include in the input vector for the next iteration until a prediction is made. A prediction is eventually made once the BMC processing the log according to the model receives a special <End-of-Log> tag as input. As noted above, in some examples, the prediction can go through a softmax processing layer to determine scores that can be used to deconfigure FRUs.

Further, the architecture in the example use can be fully connected with the final stage going through a softmax layer which uses the form in equation 8, $P(y_i | z_k) = e^z_k / \Sigma_j e^{-z}_j$, in order to obtain confidence levels for replacing each FRU k where $k \in [1, K]$ for K replaceable FRUs. As such, the final output is a vector y that has the following format where $^T$ is the transpose operator: $[<NOP>, CPU_1, CPU_p, DIMM_1, \ldots DIMM_d, I/O\text{-}slot_1, \ldots I/O\text{-}slot_s, \ldots ]^T$.

With the approaches described herein, various parts of debugging an error condition of a computing device can be automated using a BMC. The solution can take into account other error conditions found in the field from similar computing devices. Moreover, the autonomous nature allows for accurate metric reporting on failures in the field while minimizing downtime (e.g. the amount of time it may take to have a technician come out and troubleshoot the computing device). The accurate metric reporting can be fed into the deep learning model to self-improve the automated process. Moreover, the approach allows for reducing the field replacement costs for FRUs that are unnecessarily replaced in customer systems and personnel costs. Though specific examples of deep learning models are provided, other similar deep learning approaches can be implemented for both training and/or execution using deep learning parameters.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing system comprising:
   a central processing unit;
   a plurality of sets of field replaceable units (FRUs) comprising a first set of FRUs and a second set of FRUs, each of the first set of FRUs and the second set of FRUs comprising multiple FRUs, and the first set of FRUs comprising an FRU not in the second set of FRUs; and
   a baseboard management controller (BMC) run on auxiliary power while the computing system is powered off, to:
      process an error log according to a deep learning model in response to an error condition in the computing system;
      responsive to the processing of the error log, determining scores for respective sets of FRUs of the plurality of sets of FRUs, wherein each respective score of the scores relates to a probability to remove the error condition by deconfiguration of a respective set of FRUs of the plurality of sets of FRUs;
      deconfigure the first set of FRUs based on the respective score for the first set of FRUs; and
      after deconfiguring the first set of FRUs, cause a reboot of the computing system, and
   the BMC to, in response to the reboot of the computing system:
      determine whether the error condition persists; and
      responsive to a determination that the error condition does not persist after the deconfiguring of the first set of FRUs, update the deep learning model based on an updated set of parameters for the deep learning model.

2. The computing system of claim 1, wherein, in response to determining that the error condition does not persist, the BMC is further to:
   send, to an error analysis system, the error log and information regarding the deconfiguring of the first set of FRUs.

3. The computing system of claim 2, wherein the BMC is to receive the updated set of parameters for the deep learning model from the error analysis system based on the error log and the information.

4. The computing system of claim 3, wherein the BMC is further to:
   process a further error log in response to a further error condition to determine another set of FRUs to deconfigure in response to the further error condition, based on the updated deep learning model.

5. The computing system of claim 1, wherein the BMC is further to, in response to determining that the error condition persists after the reboot:

determine, according to the deep learning model, the second set of FRUs to deconfigure for the error condition.

6. The computing system of claim 1, wherein the updated set of parameters is based on feedback from another computing system.

7. The computing system of claim 1, wherein the first set of FRUs has a highest probability to have caused the error condition compared to other sets of FRUs of the plurality of sets of FRUs.

8. The computing system of claim 1, wherein the deep learning model includes a long short-term memory neural network.

9. The computing system of claim 1, wherein the BMC is run on the auxiliary power to process the error log while an operating system of the computing system is not functional.

10. A method comprising:
determining that an error condition has occurred in a computing device by a baseboard management controller (BMC) that executes on auxiliary power while the computing device is powered off, wherein the computing device includes a plurality of sets of field replaceable units (FRUs) comprising a first set of FRUs and a second set of FRUs, each of the first set of FRUs and the second set of FRUs comprising multiple FRUs, and the first set of FRUs comprising an FRU not in the second set of FRUs;
processing an error log at the BMC that executes on the auxiliary power while the computing device is powered off according to a deep learning model to determine a score for each set of FRUs of the plurality of sets of FRUs, wherein each respective score of the scores relates to a probability to remove the error condition by deconfiguration of a respective set of FRUs of the plurality of sets of FRUs;
deconfiguring, by the BMC, the first set of FRUs based on the respective score for the first set of FRUs;
after the deconfiguring, rebooting the computing device;
in response to the rebooting, performing a determination of whether the error condition persists; and
responsive to the determination that the error condition does not persist after the deconfiguring of the first set of FRUs, receiving, by the BMC, an updated set of parameters for the deep learning model, the updated set of parameters updating the deep learning model.

11. The method of claim 10, wherein in response to determining that the error condition does not persist, the method further comprises:
sending, by the BMC to an error analysis platform, information about the error log and information about the first set of FRUs deconfigured.

12. The method of claim 11, wherein the updated set of parameters is received from the error analysis platform based on the information about the error log, the information about the first set of FRUs deconfigured, and additional training data about other computing devices.

13. The method of claim 12, further comprising:
processing, by the BMC, a further error log in response to a further error condition to determine another set of FRUs to deconfigure in response to the further error condition, based on the updated deep learning model.

14. The method of claim 10, further comprising, in response to determining, by the BMC, that the error condition persists after the rebooting:
determining, according to the deep learning model, the second set of FRUs to deconfigure for the error condition;
deconfiguring the second set of FRUs;
after deconfiguring the second set of FRUs, performing a further reboot of the computing device; and
in response to the further reboot, determining whether the error condition remains persistent.

15. A non-transitory machine-readable storage medium storing instructions that upon execution cause a baseboard management controller (BMC) in a computing device to:
determine, by the BMC run on auxiliary power while the computing device is powered off, that an error condition has occurred in the computing device including a plurality of sets of field replaceable units (FRUs) comprising a first set of FRUs and a second set of FRUs, each of the first set of FRUs and the second set of FRUs comprising multiple FRUs, and the first set of FRUs comprising an FRU not in the second set of FRUs;
process, by the BMC run on the auxiliary power while the computing device is powered off, an error log according to a deep learning model to determine scores for respective sets of FRUs of the plurality of sets of FRUs, wherein the deep learning model includes updated parameters based on error condition feedback from at least one other computing device, and wherein the scores relate to a probability to remove the error condition by deconfiguration of the sets of the FRUs;
deconfigure the first set of FRUs based on the score for the first set of FRUs;
after deconfiguring the first set of FRUs, cause a reboot of the computing device;
determine whether the error condition persists after the reboot; and
responsive to determining that the error condition does not persist after the deconfiguring of the first set of FRUs, update the deep learning model based on an updated set of parameters for the deep learning model.

16. The non-transitory machine-readable storage medium of claim 15, further comprising instructions that upon execution cause the BMC to in response to determining that the error condition persists after the reboot:
determine further scores relating to the plurality of sets of the FRUs based on the deep learning model, the error log, and persistence of the error condition;
identify the second set of FRUs based on the further scores to deconfigure for the error condition;
deconfigure the second set of FRUs;
after deconfiguring the second set of FRUs, perform a further reboot of the computing device; and
in response to the further reboot, determine whether the error condition remains persistent.

17. The non-transitory machine-readable storage medium of claim 16, further comprising instructions that upon execution cause the BMC to:
in response to a determination that the error condition does not remain persistent after the further reboot, provide information about the error log and information about the second set of FRUs to an error analysis platform.

18. The non-transitory machine-readable storage medium of claim 17, further comprising instructions that upon execution cause the BMC to receive an updated set of parameters for the deep learning model from the error analysis platform that takes into consideration the error log and the information about the second set of FRUs.

19. The non-transitory machine-readable storage medium of claim 15, wherein the processing of the error log is by the BMC run on the auxiliary power occurs while an operating system of the computing device is not functional.

* * * * *